United States Patent [19]

Millerbernd

[11] 3,941,074

[45] Mar. 2, 1976

[54] AMPHIBIOUS BUS

[76] Inventor: Paul A. Millerbernd, Winsted, Minn. 55395

[22] Filed: Apr. 5, 1974

[21] Appl. No.: 458,114

[52] U.S. Cl. ............... 115/1 A; 180/24; 180/24.11; 180/44 F; 280/43.23
[51] Int. Cl.² ............................................... B60F 3/00
[58] Field of Search ......... 115/1 R, 1 A; 9/1 R, 1 T; 180/119, 44 F, 24, 24.11; 280/43.23

[56] References Cited
UNITED STATES PATENTS

| | | | |
|---|---|---|---|
| 1,634,932 | 7/1927 | Cook ................................. | 115/1 A |
| 3,161,246 | 12/1964 | Meeker et al ...................... | 115/1 R |
| 3,193,851 | 7/1965 | Fiebelkorn ......................... | 9/1 T |
| 3,308,782 | 3/1967 | Dahl .................................. | 115/1 R |

Primary Examiner—George E. A. Halvosa
Assistant Examiner—Sherman D. Basinger

[57] ABSTRACT

A bus is provided which may be driven over highways and freeways in the usual manner. The bus is equipped with elongated wheel housings which are pivoted to opposite side walls to swing from a horizontal position to a vertical position. When in horizontal position the sides of the elongated wheel housing form decks extending along opposite sides of the bus, the low hung hull forming the bottom of the bus supporting the bus in the water. When the wheel housings are swung into vertical position, the wheels carried thereby extending vertically to support the amphibious bus on land.

6 Claims, 14 Drawing Figures

AMPHIBIOUS BUS

This invention relates to an improvement in Amphibious Buses and deals particularly with a vehicle capable of traveling over water and over land with equal ease.

BACKGROUND OF THE INVENTION

Much time and money has been spent in the development of a vehicle which will travel over the highways and over the water with equal ease. For example, U.S. Pat. No. 1,602,812 issued Oct. 12, 1926 to Cook discloses a land and water craft having pontoons at opposite sides of the body which may be pivoted between two extreme positions. When the pontoons are in lowered position, the draft of the vehicle is changed so as to raise and lower the position of the craft and the body. Wheels supported by the pontoons are swung into substantially vertical position so that the vehicle may be driven onto land by the wheels. When the pontoons are swung into the opposite extreme position, and the vehicle settles to a greater extent in the water for traveling over the surface of the water. Means are provided for propelling the vehicle over the surface of the water or driving the craft over the surface of the water.

U.S. Pat. No. 2,981,221 3,982,221 issued Apr. 25, 1961 to J. Gillois et al also shows a body which is mounted upon wheels and which is provided with pontoons on each side of the body. The pontoons are of the inflatable type, and when inflated, support the vehicle on the surface of the water. When deflated, the pontoons are collapsed so as to decrease the width of the vehicle when the vehicle is traveling on land. Numerous other such amphibious self propelled vehicles have been developed in more recent years.

SUMMARY OF THE INVENTION

The present invention involves an amphibious vehicle having an elongated body including a hull integral with the body which acts to support the vehicle when on the surface of the water. Wheel housings are hingedly connected to opposite sides of the body and act to support a series of wheels designed to support the vehicle when traveling on land. The wheel housings, in one extreme position, are supported with the wheels projecting below the housings in position to support the vehicle for traveling over the land. When in the other extreme position, the wheel housings extend outwardly from the body of the vehicle in substantially horizontal position, so that the housings may form decks extending on opposite sides of the vehicle body. When in this position, the wheel housings communicate with a rear deck projecting rearwardly from the body of the vehicle.

A further feature of the present invention resides in the position of a front platform hinged to the front of the vehicle body and swingable from a position in substantially vertical relation in front of the bus body to an elevated position in which the platform is substantially horizontal, the platform forming a front deck substantially coplanar with the upper surfaces of the wheel housings.

A further feature of the present invention resides in the provision of corner forming platforms hingedly connected along opposite sides of the front platform. These corner forming platforms are foldable into a position between the front platform and the front of the vehicle when the front platform is in its vertical position. The corner forming platforms are also swingable in their other extreme positions so that the upper surfaces thereof are substantially coplanar with the upper surfaces of the front platform and the upper surface of the wheel housings to form a continuous deck along the front and sides of the body when the vehicle is in the water.

A further feature of the present invention resides in the provision of side railings which are hingedly connected to the wheel housings along longitudinal axes which extend along the outer edges of the wheel housings when these housings are in horizontal position. When the wheel housings are in the one extreme position employed when the bus in traveling over the surface of the land, these railings fold against the outer surfaces of the wheel housings and in substantially face contact therewith.

An added feature of the present invention resides in the provision of a front railing hingedly connected to the front platform and which is foldable between two extreme positions. When the front platform is in lowered positions, these front railings extend vertically along the front of the front platform and in substantial contact therewith. In the raised position of the front panel, the front railing is foldable upwardly from the forward edge of the front platform. When railings are provided along the front platform and the wheel housings, auxiliary corner railing portions may be provided to connect the sides of the front railing to the forward ends of the side railings to provide a continuous railing extending across the front platform, the corner forming platforms, and the wheel housings to form a protection for the substantially U-formed deck which is provided when the front platform and the wheel housings are in raised horizontal position.

Another feature of the present invention resides in the provision of means supporting the front wheels of the vehicle for pivotal movement about vertical axes, and means connected to these means for steering the front wheels in unison.

A feature of the preferred form of the invention lies in the provision of an engine which may drive the vehicle on land or over the water. In its preferred form, the engine develops hydraulic pressure connected to individual hydraulic motors in the wheels. In preferred form, the engine also drives a jet propulsion means at the stern of the vehicle to propel the vehicle over the water.

A feature of a modified form of construction lies in the provision of an engine within the body of the vehicle which is adapted to provide power for driving the vehicle over the surface of the water and for driving at least one pair of wheels for supporting the vehicle for movement over the land. Clutches are provided connected to this pair of wheels which connect the wheels of this pair to the engine when said wheel housings are in vertical position, and disconnect the wheels of this pair from the engine when the wheel housings are elevated into horizontal position.

These and other objects and novel features of the present invention will be more clearly and fully set forth in the specification and Claims.

DESCRIPTION OF THE PREFERRED EMBODIMENT

Figure 2:
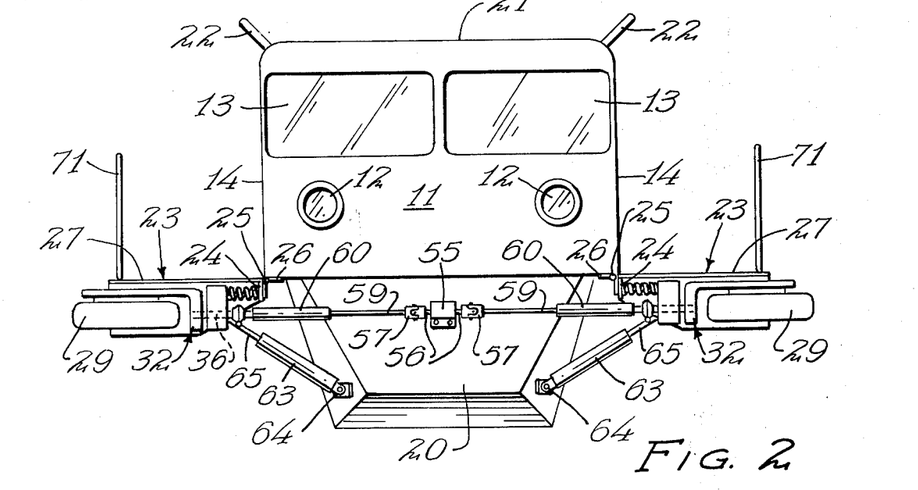
FIG. 2 is a front elevational view of my bus when in position on the water.
Figure 3:
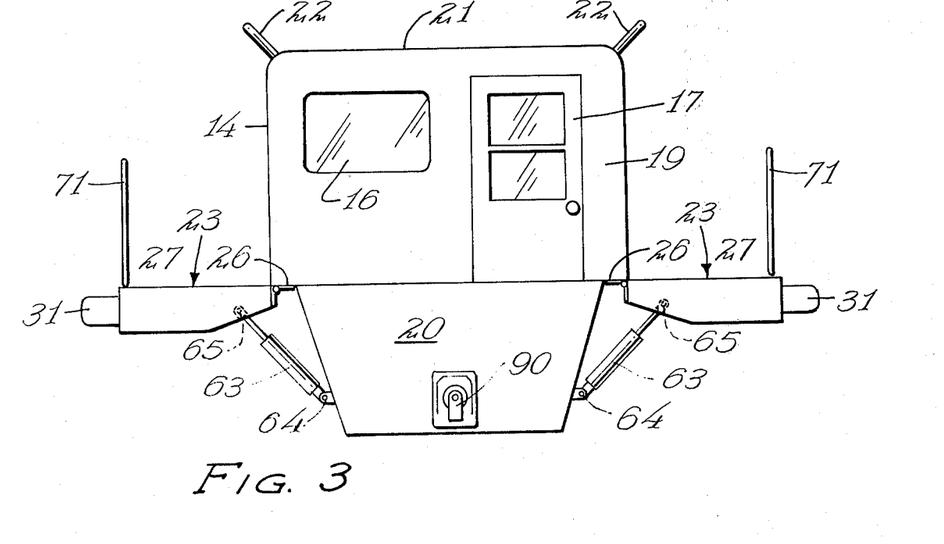
FIG. 3 is a rear elevational view of the amphibious bus in position for traveling over the water.

Many sheets of drawings would be required to illustrate all details of the present amphibious bus, and the Figures are, for the most part, shown diagrammatically in an effort to simplify the illustration. In general, the vehicle which is indicated in general by the letter A includes an elongated body having a central hull which extends throughout the length thereof intermediate its sides. The body is indicated in general by the numeral 10 and is provided with a front 11 equipped with a suitable headlight 12 and suitable window 13 extending transversely of the front and adjoining portions of the side walls 14 as indicated at 15. Additional windows such as 16 may be provided near the rear ends of the sides and on the back as indicated in FIG. 3. An access door 17 is provided in the rear wall 19. The elongated hull is indicated generally by the numeral 20. The bus body 10 is provided with a roof or top 21 indicated in FIGS. 1, 2 and 4 of the drawings, and in the arrangement illustrated, upwardly and outwardly inclined railings 22 are provided as the junction of the top 21 and the sides 14.

Figure 1:
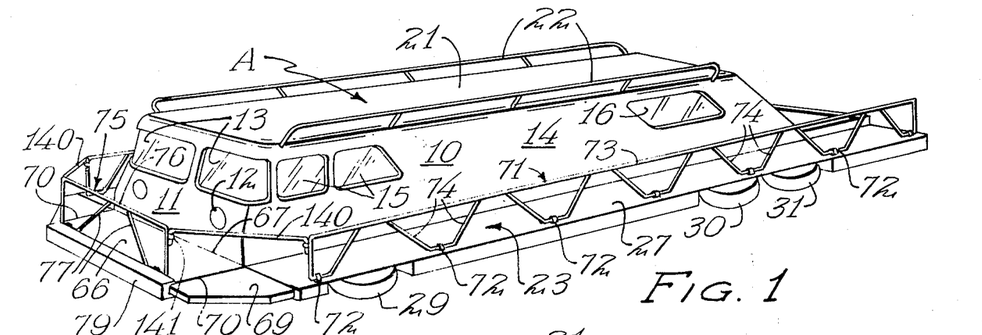
FIG. 1 is a perspective view of my amphibious bus in position for traveling over the water.
Figure 4:
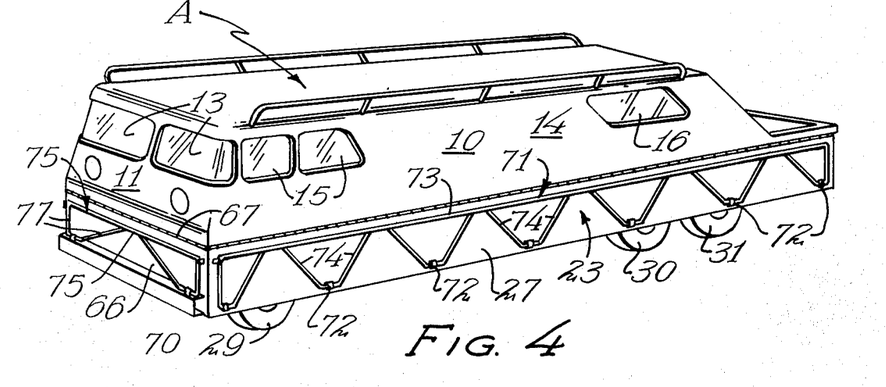
FIG. 4 is a perspective view of the amphibious bus in position for traveling over the land.

Wheel housings which are illustrated in general by the numeral 23 include upper walls or flanges 24 which are hingedly connected at 25 (see FIGS. 2 and 3) to the under surface 26 of a horizontal offset between the upper portion of the body 10 and the hull 20. The wheel housings 23 are provided with outer panels 27 which form the outer walls of the wheel housings 23 when the wheel housings 23 are in vertical positions as indicated in FIG. 4 of the drawings. These outer panels 27 form the side decks of the vehicle when the wheel housings 23 are in their other extreme position or in horizontal position extending outwardly from the body sides 14 as indicated in FIGS. 1 and 2 of the drawings. A pair of front wheels 29 are supported in the wheel housings in a manner which will be described, and two pairs of rear wheels 30 and 31 are supported to project below or beyond the outer side plates 27 in a manner which is also diagrammatically illustrated.

Figure 5:
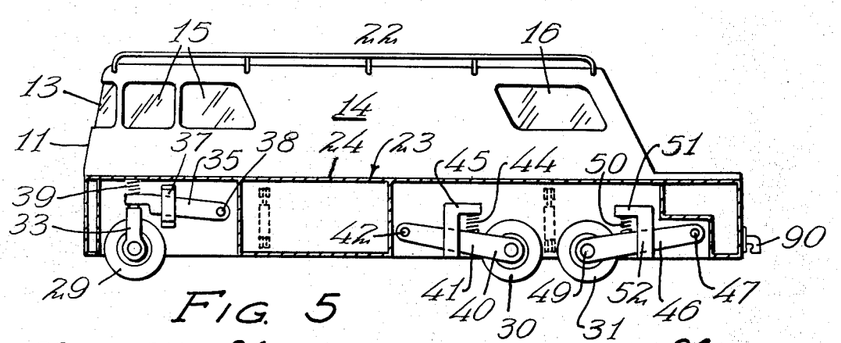
FIG. 5 is a side elevational view of the bus, a portion of one of the wheel housings being cut away to disclose the wheel supports.
Figure 6:
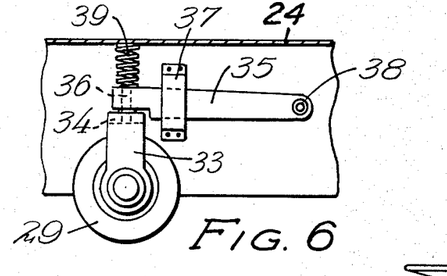
FIG. 6 is a side elevational view through one of the wheel housings showing the manner in which the front wheels are supported.
Figure 8:
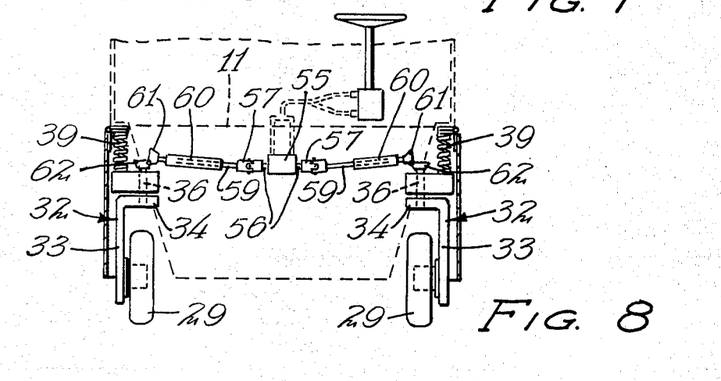
FIG. 8 is a diagrammatic view showing the steering apparatus.

As indicated in FIGS. 5 and 6 of the drawings, and also shown in FIG. 8 of the drawings, the front wheels 29 are supported by semi-yokes 32 having flanges 33 which extend vertically and right angular flanges 34 at the ends thereof which are uppermost when the wheels are in vertical land driving position. The flanges 34 of the semi-yokes 32 are pivotally connected to supporting arms 35 by shafts 36 which extend vertically through bearings (not illustrated) in the arms 35, the bearings and shafts extending substantially vertically in the vertical position of the wheel housings. The arms 35 are supported by horizontally extending pivots 38 and are limited in their pivotal movement by brackets 37. Springs 39 are supported between the forward ends of the arms 35 and the top flanges 24 of the wheel housings to cushion the movement of the arms 35 when the vehicle is resting upon the supporting wheels 29, 30 and 31. In other words, the springs 39 are shown to represent shock absorbers to lessen the shocks imposed upon the front wheels 29 as the vehicle travels on land.

Figure 7:
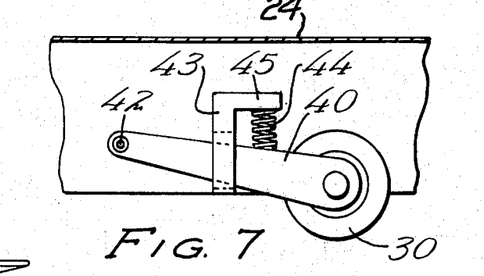
FIG. 7 is a detailed view showing the manner in which the rear wheels are supported.
Figure 10:
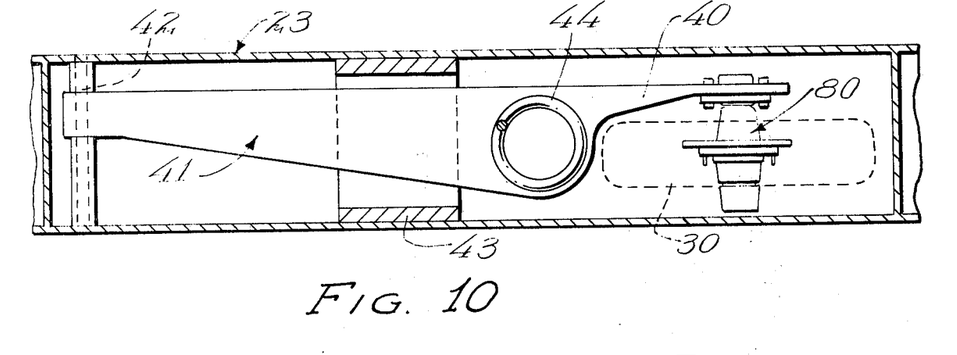
FIG. 10 is a top plan view showing diagrammatically one of the rear wheel supports.

The manner in which the rear wheels 30 and 31 are supported is also diagrammatically illustrated in FIGS. 5, 7 and 10 of the drawings. The foremost rear wheels 30, as shown in these Figures, are pivoted to one end 40 of the arms 41 pivotally attached at 42 to each wheel housing 23. Each arm 41 extends through a fixed bracket 43 on the wheel housing to limit the pivotal movement of the arm 41. A compression spring 44 represents a shock absorber between the angularly turned end 45 and the arm 41.

As indicated in FIG. 5 of the drawings, a similar arm 46 is hinged to the wheel housing 23 at 47 and is hinged to the motor shaft 49 of the drive motor, which will be described, and a spring 50 is interposed between a horizontal end 51 of the pivot limiting bracket 52 mounted upon the wheel housing 23.

The springs 44 and 50 are shown merely to indicate that the swinging movement of the wheel supporting arms 41 and 46 is dampened by suitable means to cushion the movement of the vehicle body 10, and to indicate that each of the wheels is supported in a manner to cushion the ride.

A hydraulic steering motor 55 is secured in any suitable manner to the front 11 of the vehicle A, the motor 55 including opposed shafts 56, each connected to one end of a corresponding universal joint 57, the other end of each of which is connected to a different one of a pair of shafts 59. The shafts 59 are each in telescoping relation to one of a pair of a cooperable hollow shafts 60. The hollow shaft 60 on each side of the center of the bus body is connected to a bevel gear 61 which is in mesh with a cooperable bevel gear 62 mounted at the upper end of each pivot shaft 36. In the particular construction illustrated, the unit containing each set of bevel gears 61 and 62 is of a somewhat unusual type known to the trade as "Gray & Prior Hinged Gear Joint" produced by the Gray & Prior Machine Company of Hartford, Conn. In this construction the bracket connecting the bevel gears is hinged, and the bevel gears 61 and 62 are provided with intermeshing generally hook-shaped teeth which permit the bevel gears to interengage while the supporting shafts swing from a generally right angular relationship as shown in FIG. 8 of the drawings to substantial alignment as indicated in FIG. 2 of the drawings. In any event, the rotation of the shafts 56 and either direction will cause a corresponding rotation of the shafts 36 extending through the forward ends of the arms 35, swinging the semi-yokes 33 supporting the front wheels 29 in a direction to turn the wheels 29 in unison.

The wheel housings 23 are swung from one extreme position in which the various supporting wheels are vertical and supported on substantially horizontal axes to another extreme position indicated in FIGS. 1 and 2 where the various supporting wheels extend horizontally and the wheel axes are substantially vertical. This pivotal movement may be accomplished by cylinder and piston devices diagrammatically shown at 63 in FIG. 2 of the drawings. One end of the cylinder piston arrangement 63 is hingedly connected at 64 to the wall of the hull 20 while the other end is connected to a bracket 65 on each wheel housing.

Figure 12:
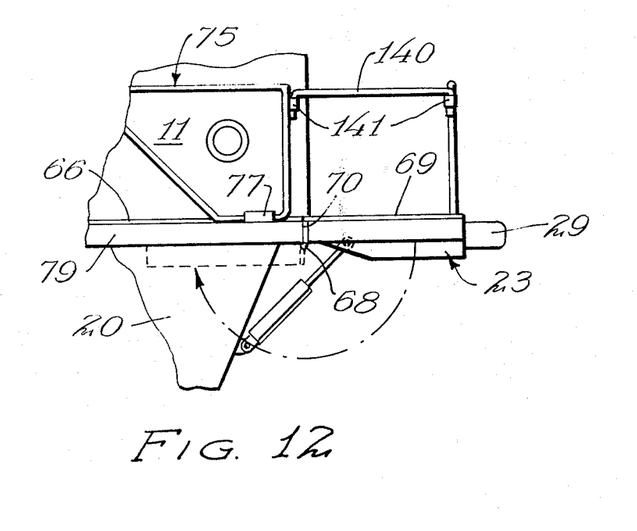
FIG. 12 is a partial front elevational view of my bus showing the detail of one of the corner forming platforms in raised position.

As is best illustrated in FIG. 1 and 4 of the drawings, a front platform 66 is pivotally connected along a hinge line 67 to the front of the bus. This platform has been omitted in FIG. 5 to simplify the showing thereof. The platform 66 is swingable from a generally vertical position indicated in FIG. 4 to a generally horizontal position as indicated in FIG. 1. When in the position indicated in FIG. 1, the upper surface of the platform 66 is substantially coplanar with the panels 27 of wheel housings 23 in raised position of these housings. To fill in the gaps between the forward ends of the raised wheel housings 23 and the sides of the platform 66, corner forming platforms 69 of generally triangular shape are foldably connected to the side edges 70 of the front platform 66, these corner forming platforms being indicated in FIG. 1 and FIG. 12 of the drawings. The hinges 68 connecting the front panel 66 and the corner forming panels 69 are illustrated in FIG. 12 and the means of locking the corner forming panels in coplanar relation with the front platform 66 and the panel 27 of the wheel housings 23 is not shown, the manner in which the corner forming panels are connected to the forward ends of the wheel housing 33 being believed obvious to a person skilled in the art.

Side railings 71 are hingedly connected along longitudinally spaced pivot sleeves 72 to the outer side plates 27 of the wheel housings 23. The upper rail 73 on each railing 71 is supported by series of generally V-shaped supporting brackets 74. The brackets 74 are pivoted at 72 to the edge of each plate 27 which is lowermost in vertical positions of the wheel housings and which is outermost in raised positions of the wheel housings. In the lowered position of the wheel housings each railing 71 is pivoted into position lying in face to face engagement with the wheel housing panel 27 as indicated in FIG. 4 of the drawings. In the raised position of the wheel housings 23, as indicated in FIGS. 1 and 2 of the drawings, each railing 71 may be swung into vertical position.

A railing 75 is hinged to a bumper 79 attached to the front platform 66 at the forward edge thereof when the platform 66 is in elevated position. The railing 75 includes a top rail 76 which is supported in horizontal position by rail brackets 77. The brackets 77 are pivotally supported to the bumper 79 which in turn is connected to the forward edge of the platform 66. The bumper 79 serves the usual capacity of a vehicle bumper when the front platform 66 is lowered as indicated in FIG. 4 of the drawings.

The individual wheel motors are not illustrated in detail but are diagrammatically indicated by the numeral 80. These motors may be of the type distributed by Bird-Johnson Company having its office at 883 Main St., Walpole, Mass., 02081. Motors of that type advertised as "Hytorque Hydraulic Motors" and are advertised in a bulletin published by the manufacturer and designated CHM-1 (5M-3/73). The hydraulic motors may also be of a type produced by Pneumo Dynamics Corporation of Blair, Neb.

Figure 11:
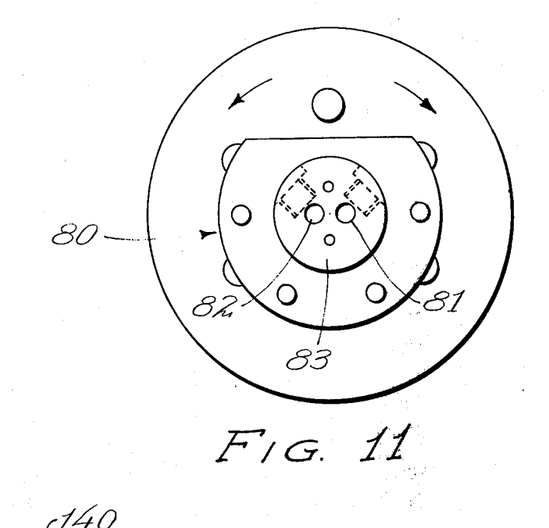
FIG. 11 is a diagrammatic view of one of the wheel motors.

The direction of rotation of each motor 80 is changed by reversing the flow through the pressure and return ports. In order to place the motor in neutral a condition where the casing will rotate freely about the fixed shaft, the fluid under pressure is diverted to a different area of each motor. FIG. 11 is a round diagram of the motor showing the fixed shaft passages 81, 82 extending longitudinally through the shaft 83. The detail of the hydraulic motors is not shown it only being necessary to describe the fact that the motors 80 are hydraulic motors capable of rotating in either direction when hydraulic force is applied thereto.

Each motor is preferably provided with a wheel disc brake. The disc brakes are conventional and are operated in any suitable manner as by a foot pedal, not illustrated in the drawings. If desired, the brakes may be provided on the rear wheels only.

Figure 9:
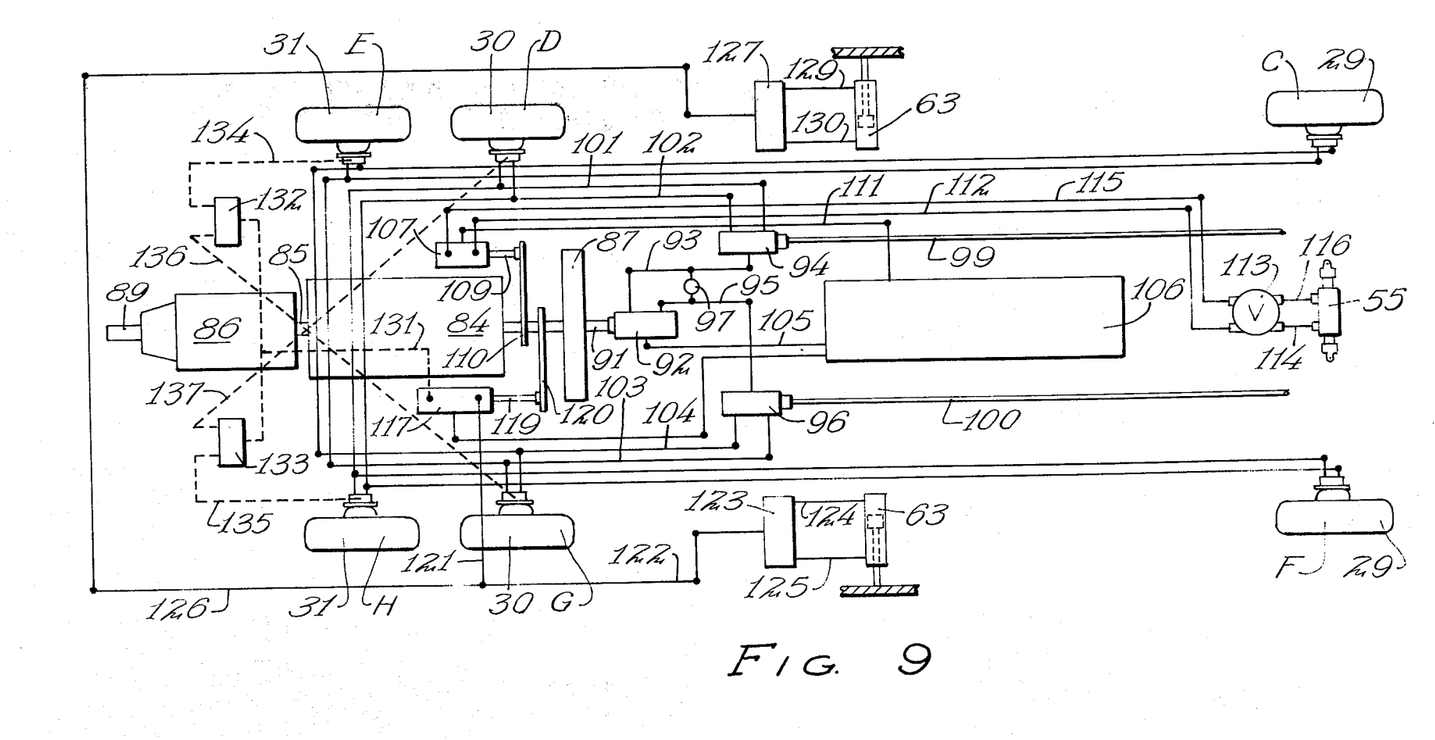
FIG. 9 shows diagrammatically the hydraulic system of the vehicle.

With reference now to FIG. 9 of the drawings, the hydraulic fluid system is diagrammatically illustrated. As shown in FIG. 9, the power source includes an internal combustion engine 84 which includes a driven shaft 85 supplying power to a jet pump 86. While not shown in detail, the jet pump acts to circulate the water through a radiator 87 and the engine block, and also drives water through a water line 89 to a jet nozzle 90 extending through the rear of the hull 20. While not illustrated in detail, the jet may comprise a structure known as the Berkeley Jet-Drive illustrated in a bulletin published by the Berkeley Pump Company of Berkeley, Calif. and illustrated in Page 7 of the bulletin 203 published by this Company.

A shaft 91 extends forwardly from the engine and drives three pumps. One of these pumps 92 is connected directly to the shaft 91 and may direct fluid through a pressure line 93 to a four-way valve 94 which directs the fluid under pressure to three of the wheels as will be described. Fluid under pressure is also directed from the pump 92 through a pressure line 95 to a second four-way valve 96 which supplies fluid pressure in either direction to the remaining three wheels. A needle valve 97 is provided between the pressure lines 93 and 95 for the purpose of by-passing fluid when the vehicle is turning corners, or if the pump 92 includes pump elements delivering different volumes.

As is diagrammatically illustrated, control members 99 and 100 are connected to the valves 94 and 96 respectively for the purpose of manually moving these valves by the vehicle operator when it is so desired.

For the purpose of better describing the circuit, the individual wheels on one side of the bus are doubly identified by the letters C, D and E and those on the opposite side of the bus are doubly identified by letters F, G and H. The letters C and F identify the front wheels 29 on opposite sides of the vehicle, the letters D and G identify the opposed rear wheels 30 and the rearmost rear wheels 31 are doubly identified by the letters E and H. The valve 94 directs fluid through a pressure line 101 to drive the wheels, D H and F in a forward direction, and through a pressure line 102 to the motors in wheels D, H and F to drive the motors in a reverse direction. The four-way valve 96 directs fluid through pressure line 103 to drive the motors connected to wheels C, E and G, and through the pressure line 104 to direct fluid to the hydraulic motors in the wheels C, E and G in a reverse direction. The purpose of this arrangement is to balance the pressure to wheels on opposite sides of the bus.

The pump 92, as well as the pumps which will later be described are provided with fluid, the fluid to the pump 92 being drawn through a supply line 105 connected to a fluid reservoir 106. Return flow lines are not illustrated in this schematic diagram.

A second pump 107 shown in the fluid diagram above the engine 84 is driven by a pump shaft 109 connected by a belt 110 to the engine shaft 91. The pump 107 draws fluid from a suction line 111 connected to the reservoir 106 and may drive fluid through a pressure line 112 to a valve 113 capable of selectively directing fluid through a line 114 to the steering motor 55. Rotation of the motor in one direction turns the front wheels 29 in one direction. Operation of the pump 107 may also direct fluid through a line 115 connected to the valve 113. When properly positioned, the valve 113 may connect the fluid under pressure to a line 116 connected to the steering motor 55 to drive the steering motor in a manner to turn the front wheels 29 in an opposite direction. Alternatively, the valve 113 may supply fluid to a conventional fluid drive system to selectively turn the forward wheels to turn the vehicle or to hold the steering wheels in a selected position.

The third pump 117 is shown in the diagram beneath engine 84 and is driven by a shaft 119 connected to the engine drive shaft 91 by a belt 120. The pump 117 supplies fluid through pressure lines 121 and 122 to a valve 123 which directs fluid either through the line 124 or the line 125 to the cylinder piston device 63 acting to raise and lower the wheel housing 23 on one side of the bus. The pump 117 also is capable of directing fluid through the lines 121 and 126 to a four-way valve 127. Pressure connections 129 and 130 connect the valve 127 with the other cylinder, piston device 63 to raise and lower the wheel housing on the opposite side of the vehicle, the two cylinder, piston devices operating in unison.

Apparatus is diagrammatically shown for placing the motors in the pairs of wheels 31 or in the pairs of wheels 30 in neutral position. As has been described, fluid must be directed to the motors 80 and place the motor in neutral. The apparatus for accomplishing this result is indicated in dotted outline in order to differentiate from the other pressure lines connected to these wheels. The pump 117 may force fluid through a pressure line 131 connected to valves 132 and 133. When in one position of the valves 132 and 133, fluid under pressure is directed through the lines 134 and 135 to direct fluid to the rearmost wheels 131 (the individual wheels E and H) while in the other position, fluid under pressure may be directed through passages 136 and 137 to the motors of the remaining rear wheels 130, individual wheels D and G in the diagram. The arrangement is such that when the vehicle is started for movement, all of the wheels 29, 30 and 31 are supplied with fluid under pressure to drive these wheels. As speed of the vehicle picks up, two of the rear wheels 31 are placed into neutral, directing added fluid to the remaining motors connected to the wheels 29 and 30. When the vehicle is traveling at still a greater speed, the motors on the wheels 30 are placed in neutral, thereby directing all of the fluid to the front wheels 29.

With this construction, the vehicle may be driven along a highway to a lake or other body of water, and driven down the shore into the water. When the bus is supported by the hull, the cylinder, piston means 63 may be actuated to raise the wheel housings into horizontal position. The front platform 66 may be swung into horizontal position either before or after the vehicle is in the water. The corner forming platforms 69 are raised into horizontal position. Means, not shown in the drawings, are provided for holding the front platform 66, corner forming platforms 69, and wheel housings in horizontal position. Means is also provided, not shown in the drawings, for locking the wheel housings in vertical position.

The railings are erected along the sides and front platform and corner railings 140 are linked to sockets 141 on the sides of the platform railing 75 and the forward ends of the side railings 71 to form a continuous railing about three sides of the bus. The floating vehicle may then be driven and steered by proper operation of the jet nozzles 90.

Figure 13:
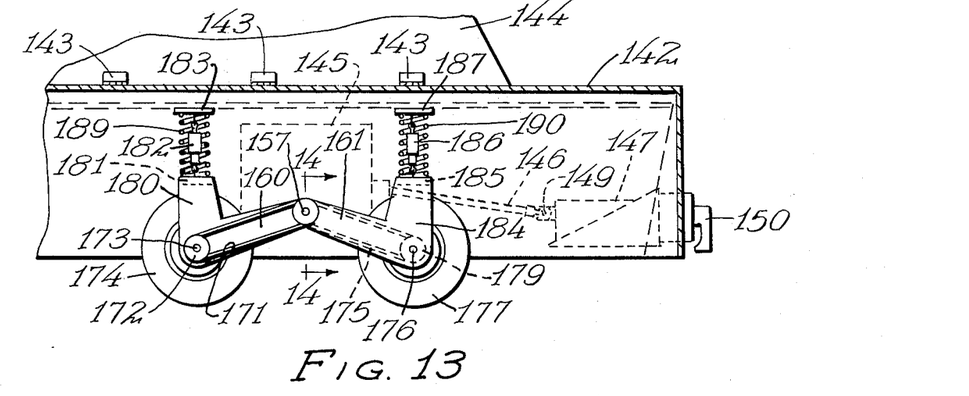
FIG. 13 is a diagrammatic vertical view in section of an alternate means for driving the rear wheels of the vehicle.
Figure 14:
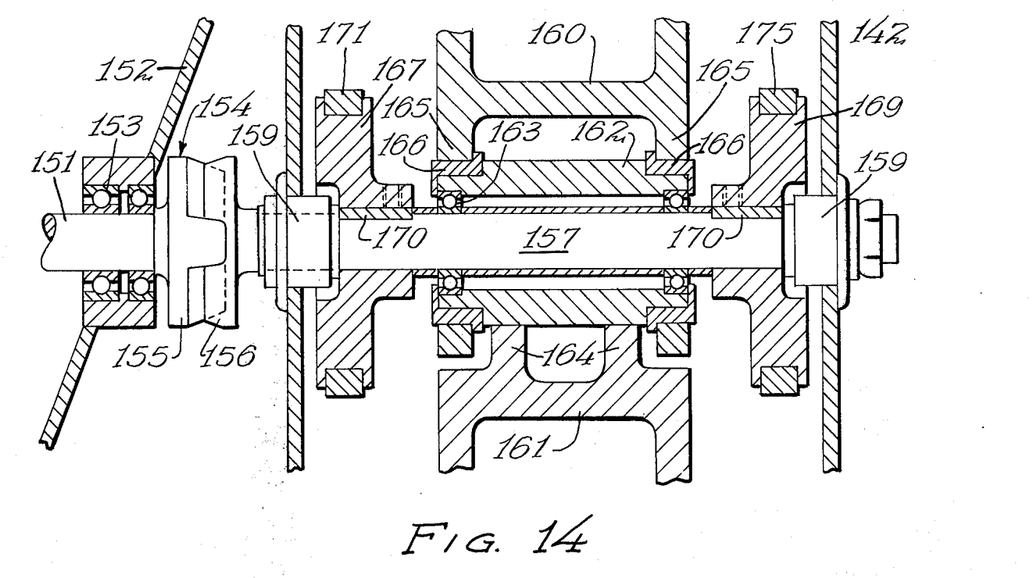
FIG. 14 is a diagrammatic transverse sectional view through a portion of the wheel driving structure, the position of the section being indicated by line 15—15 of FIG. 14.

In FIGS. 13 and 14 I disclose a modified form of bus having a different type of drive mechanism. While the complete bus is not shown in these Figures, in general, the device is quite similar to that previously described and includes a housing 142 which is foldably connected by hinges 143 to the bus body 144. The bus differs from the previously described construction in that it includes an internal combustion engine 145 which is capable of driving both the hull itself and also the various wheels.

The motor 145 is shown diagrammatically in dotted outline and acts to drive a propellor shaft or drive shaft 146 which in turn operates a pump 147 through a universal joint 149. The pump 147 supplies water to the jet 150 which forces water from the jet nozzle to drive the craft. Obviously, suitable clutch means, not illustrated in the drawings, is provided so that the pump 147 can operate intermittently as determined by the driver of the vehicle.

The motor 145 is also selectively operable to drive a transversely extending shaft 151 extending through the hull 152 of the bus. Bearings 153 are supported by the hull wall 152 to support the shaft 151. A clutch 154 includes a clutch section 155 which is rotatable with the shaft 151. The clutch 154 also includes the second section 156 mounted upon the transverse shaft 157. The shaft 157 is supported by bearings 159 in the walls of the housing 142. Wheel supporting arms 160 and 161 are pivotally supported by the shaft 157. The arm 161 is provided with a hub 162 supported on the shaft 157 by bearings 163. A portion of the arm 161 is reduced in width as indicated at 164 so as to provide a space for supporting the arm 160.

The arm 160 is provided with a hub 165 supported by a friction bearing 166 mounted upon the hub 162. A first sprocket 167 is mounted upon the shaft 157, and a second sprocket 169 is mounted upon the shaft 157 on opposite sides of the arms 160 and 161. The sprockets 167 and 169 are keyed to the shaft 157 as indicated at 170.

With reference now to FIG. 13 of the drawings, a chain or belt such as is used in a timing belt 171 connects the sprocket 167 to a sprocket 172 on a wheel shaft 173. A wheel 174 which is the forward wheel of the pair is supported by the shaft 173 and driven by the chain 171. A second chain 175 is mounted upon the sprocket 169, and connects the sprockets 169 with a sprocket 179 on the axle 176. A wheel 177 is mounted upon the axle 176 and assists in supporting the housing 142. Both of the wheels 174 and 177 are accordingly driven by rotation of the shaft 157 on which each of the arms 160 and 161 are pivotally supported.

The wheels supporting arm 160 is actually a bell crank lever which supports the wheel 174 at the corner between arm ends. The arm ends 180 is supported at its upper end by a transversely extending member 181 which forms a bearing for the arm support. A shock absorber 182 is connected between the transverse member 181 and a cross member 183 within the housing 142. In a similar manner, the arm 161 which also comprises a bell crank lever with the axle 176 midway between the ends thereof, has an arm at 184 which supports a transverse member 185. A shock absorber 186 is connected between the arm end 185 and a transverse supporting member 187 extending across the housing 142. Springs 189 and 190 are interposed between the transverse members 181 and 185 and the transverse member 183 and 187. Thus, the springs 189 and 190 bear the weight of the vehicle while the shock absorbers 182 and 186 resist movements of the wheel supporting arms in either direction.

From the foregoing description, it will be seen that when the supporting wheels 174 and 177 are resting upon the surface of the ground, rotation of the transverse shaft 151 acts through the clutch 154 to rotate the transverse shaft 157. Rotary motion of the shaft 157 acts through the sprockets 167 and 169 to operate the chains 171 and 175. Movement of the chains 171 and 175 rotates the sprockets 172 and 179 rotating the axles 173 and 176 which drive the wheels 174 and 177. The supporting wheels are accordingly driven by the engine 145 to drive the vehicle.

With reference back to FIG. 14 of the drawings, it will be noted that rotary movement of the transverse shaft 151 can be transmitted to the shaft 157 only when the clutch 154 is engaged as indicated in FIG. 14. When the housings 142 are swung upwardly, the two sections 155 and 156 of the clutch separate and swing out of mesh. As the housing swings downwardly to the position indicated in FIG. 14, the clutch 154 automatically connects the shaft 151 and 157 for rotation in unison. The clutch sections 155 and 156 swing into movement as the housings 142 swing downwardly, the clutch sections being so constructed as to cause relative rotation of one section or other as the clutch sections mesh together. Obviously, when the wheels 174 and 177 rest upon the ground, the wheels are positively driven by the chains 171 and 175. Movement of the vehicle is controlled by suitable clutch means which is not illustrated in the drawings so that the wheels may be rotated at the will of the driver of the vehicle. Usually, when the wheels 174 and 177 are rotated, the power to the pump 147 is disconnected. However, it need not cease movement if the driver so desires. In other words, the supporting wheels may be driven at the same time the pump is in operation. This is desirable when the vehicle is approaching the shore, as it may be necessary to use the supporting wheels to assist in driving the vehicle along the lake bottom, and it also may be desirable to use the jet nozzle 150 for assisting the movement of the vehicle, particularly when the body of water is muddy or sandy. As the vehicle moves along the ground, each of the supporting wheels 174 and 177 are individually mounted so that the vehicle may travel over rough terrain with a maximum of ease. The same type of means may be used to swing the housings from vertical position to horizontal position and vice versa may be similar to that previously described. In view of the fact that the wheel supporting arms 160 and 161 are supported on a common axis, both of the chains 171 and 175 may be driven from the common transverse shaft 151.

In accordance with the Patent Statutes, I have described the principles of construction and operation of my invention in AMPHIBIOUS BUS; and while I have endeavored to set forth the best embodiment thereof, I desire to have it understood that changes may be made within the scope of the following claims without departing from the spirit of my invention.

I claim:

1. An amphibious bus including an elongated body having an elongated watertight hull forming the bottom thereof,
   a pair of wheel housings hingedly connected to opposite sides of said body,
   said wheel housings being hingedly supported for movement between two extreme positions, the sides of the housings extending in a substantially vertical position in one said extreme position and extending in a substantially horizontal position in the other extreme position,
   wheels for supporting said body,
   means supporting said wheels within said wheel housings between said sides thereof, said wheels from said wheel housings to extend downwardly therefrom when said sides thereof are vertical and extending outwardly therefrom when said housing sides are horizontal,
   means connected between said elongated body and said housings to move said wheel housings from one extreme position to the other,
   means connected to at least certain of said wheels for driving the same when said wheel housings are in said one extreme position, and
   said elongated body having a forward end and a rear end,
   yokes supporting the pair of foremost wheels which are nearest the forward end of said body,
   shafts on said yokes,
   means supporting said shafts to said wheel supports to extend substantially vertically in said one extreme position of said wheel housings and to extend substantially horizontally in said other extreme position of said wheel housings,
   means connected to said shafts for rotating the same in unison when said shafts are in a substantially vertical position,
   a front platform, hinge means along an edge of said platform connecting said platform on a generally horizontal axis to the forward end of said body, said hinge means supporting said platform for movement between a substantially vertical position and a substantially horizontal position extending forwardly from said body.

2. The structure of claim 1 and in which said wheel housings include outer side panels which are substantially coplanar with the upper surface of said platform when said platform is in substantially horizontal position and said wheel housings are in said other extreme position.

3. The structure of claim 2 and including corner forming members hingedly connected to the sides of said platforms along parallel axes, said corner forming platform members being folded inwardly and rearwardly of said platform and parallel thereto when said platform is in said substantially vertical position, and substantially coplanar with the upper surface of said platform when said platform is in its substantially horizontal position.

4. The structure of claim 3 and including a front bumper and front railing hingedly secured to the edge of said platform which is parallel and opposite to said hinged edge thereof, said front bumper and railing being pivotal between a position parallel to said platform and adjacent to the same to a position extending upwardly therefrom when said platform is in substantially horizontal position.

5. The structure of claim 4 and including side railings hinged to said wheel housings along the edges of said outer side panels which are lowermost when said wheel housings are in said one extreme position, and uppermost when said wheel housings are in said other extreme positions.

6. The structure of claim 5 and including corner railings detachably connected between the sides of said front railing and the forward ends of said side railings.

* * * * *